3,678,008
THERMOSETTABLE AROMATIC AMINE FORMALDEHYDE RESIN COMPOSITIONS MODIFIED WITH AN AROMATIC POLYCARBOXYLIC COMPOUND

Rodney M. Huck, Longmeadow, and John R. Le Blanc, Wilbraham, Mass., assignors to Monsanto Company, St. Louis, Mo.
No Drawing. Continuation-in-part of application Ser. No. 792,790, Jan. 21, 1969. This application Sept. 23, 1970, Ser. No. 74,874
Int. Cl. C08g *9/06, 15/00*
U.S. Cl. 260—65                           7 Claims

---

ABSTRACT OF THE DISCLOSURE

Thermosettable polymeric compositions incorporating an aromatic amine formaldehyde resin and an aromatic polycarboxylic compound. When thermoset by heat, these compositions display improved thermal stability. Because of their solvent solubility characteristics, these compositions are useful for preparing varnishes. They are also useful in molding powders.

---

RELATED APPLICATIONS

This application is a continuation-in-part of our earlier filed U.S. patent application, Ser. No. 792,790, filed Jan. 21, 1969.

BACKGROUND

Heretofore, those skilled in the art of aromatic formaldehyde resins have long appreciated that such resins are difficulty thermosettable by nature. In fact, they can be used as thermoplastic materials. The art has long sought to improve the thermosetting characteristics of aromatic amine formaldehyde resins by varying either or both the resin molecular weight or the curing agent used to enhance thermosetting thereof.

Another problem with such resins has been that, when thermoset, they tend to have insufficient thermal stability (e.g. such as the ability of a particular thermoset resin to withstand, and be stable to, prolonged exposure to elevated temperatures). Thermal stability can be determined by any convenient means, such as by relative film solubility in a strong solvent (such as dimethylformamide), by thermal gravimetric analysis, or by strength retention measurements of standardized laminate constructions (containing a given thermoset resin to be tested).

Still another problem associated with such resins has been the difficulty of preparing thermosetting varnishes therewith. Such varnishes must have their resin contents in solution (or substantially so) in order to permit, for example, uniform impregnation of various sheet members, especially those of the type used to make laminates. The varnish must further and for similar reasons have the resin crosslinking (or curing) agent likewise in solution (or substantially so). Many aromatic amine-formaldehyde resins heretofore known, particularly when in combination with a curing agent, display a troublesome tendency to gel, making the preparation of stable varnishes an exceedingly difficult task. Yet varnishes remain of great commercial significance for many end use applications.

A new and much improved class of thermosettable aromatic amine-formaldehyde resin composition has now been discovered. This class comprises a thermosettable mixture of a certain class of aromatic amine-formaldehyde resins with a certain class of aromatic polycarboxylic acid anhydrides. When compared with, for example, known thermosettable aniline formaldehyde resins containing sufficient excess formaldehyde to thermoset by heat alone, this new class of compositions has surprising ability to thermoset and has surprising thermal stability when thermoset. Furthermore, this new class of compositions is suitable for the preparation of non-gelling varnish compositions.

SUMMARY

The present invention relates to new and useful thermosettable solvent soluble aromatic amine-formaldehyde resin compositions, and to thermoset thermally stable products derived therefrom.

The thermosettable compositions of this invention comprise a mixture of at least one member from a class of aromatic amine-formaldehyde resins and at least one mmeber from a class of aromatic polycarboxylic compounds. The class of aromatic amine-formaldehyde resins has a primary amine ($H_2N-$) content smaller than about 70 mol percent and a secondary and tertiary combined amine ($HN<$) content greater than about 30 mol percent where 100 mol percent is the total amine content, and, in addition is generally characterized by having:

(1) a number average molecular weight of from about 300 to 1200, (2) at least two aryl moieties per molecule, the aryl nucleus of each aryl moiety containing from 6 through 10 carbon atoms each, (3) less than 0.4 divalent bridging moieties per said aryl moiety of the formula:

(1)   

wherein $R_1$ and $R_2$ are each individually selected from the group consisting of hydrogen, and alkyl radicals of less than 5 carbon atoms each said bridging moiety having each unsatisfied valence of its carbon atom each bonded to a different one of said aryl moieties, (4) a number average of primary amine groups per said aryl moiety of less than about 0.70, (5) a number average of methylene amine groups (i.e. $-CH_2N-$) per said aryl moiety of greater than about 0.3, (6) a percent nitrogen acetyl of from about 10 to 30.

The class of an aromatic polycarboxylic compound is characterized by the general formula:

(2)   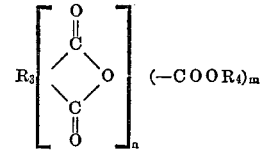

where:

$R_3$ is an aromatic radical of four, five, or six valences which contains from 6 through 24 carbon atoms,
$R_4$ is selected from the group consisting of hydrogen and monovalent hydrocarbon radicals containing less than 8 carbon atoms each,
$n$ is an integer of from 0 through 2,
$m$ is an integer of from 0 through 6,
the sum of $n$ plus $m$ is always at least two,
when $n$ is 0, $m$ is at least 4,
when $m$ is 0, $n$ is at least 2,
when $m$ is 1, $n$ is at least 2, and
when $n$ is 1, $m$ is at least 2.

Preferably, $R_1$ and $R_2$ are both hydrogen, $R_3$ contains a single six membered aromatic ring (i.e. phenyl), and $R_4$ is an alkyl radical containing less than four carbon atoms.

In general, in any given composition of this invention, there is present for a given amount of such an aromatic amine-formaldehyde resin at least sufficient amount of such an aromatic polycarboxylic compound to make the resulting composition thermosettable by heat alone (especially when such composition is in the form of a uniform mixture of the respective two components); for example, at a temperature of about 150° C.

Sometimes as little as about 5 or 10 weight percent (or even less) of the stoichiometric amount of aromatic polycarboxylic compound needed to completely react on a 1:1 mol basis with aromatic amine-formaldehyde resin is needed to effect thermosetting. On the other hand, sometimes as much as a 100 percent excess (or even more) of such a stoichiometric amount is desirable to produce thermosetting of a composition of this invention. The relative amounts of each component employed in a given composition of the invention can vary over an extremely wide range. The optimum amounts of each component for any given composition depend on a host of variables, including end use considerations, so that it is not possible or practical to specify specific relative amounts for individual compositions.

For purposes of this invention, the term "thermoset" or "thermosetting" in reference to a composition of this invention indicates that such composition, after exposure to elevated temperatures for times sufficient to substantially completely react together substantially all of at least one of the two components present is converted to a product which is substantially insoluble, and substantially infusible. For purposes of this invention, the term "substantially insoluble" in relation to "thermoset" or "thermosetting" has reference to insolubility in common organic solvents (e.g. methyl ethyl ketone), so that not more than about 10 weight percent of a given so thermoset product dissolves in such a solvent. Similarly, the term "substantially infusible" has reference to the fact that a given or thermoset product does not appreciably melt before decomposing when heated to elevated temperatures (e.g. 250° C.).

Because of a tendency during a thermosetting reaction for undesirable side reactions to occur (such as hydrolysis of the Formula 2 compounds), and because of the possibility that during thermosetting compositions of this invention would not uniformly crosslink, compositions of this invention are preferably thermoset with heat in a substantially anhydrous form. The term "substantially anhydrous" has reference to the fact that a given composition contains initially (before thermosetting) less than about 5 weight percent free water (based on total weight), preferably less than about 1 weight percent, and more preferably less than about ½ weight percent.

The aromatic amine-formaldehyde starting material

In general, any aromatic amine-formaldehyde resin known to the prior art having the above-described characteristics can be used in the compositions of this invention. Because of possible ambiguities in prior art teachings relating to production of aromatic amine formaldehyde, a brief discussion of the preparation and properties thereof is now given.

For purposes of this invention, total nitrogen acetyl percent of an aromatic amine-formaldehyde resin is conveniently determined by the method of Sidney Siggia given in "Quantitative Organic Analysis," John Wiley & Sons, 3rd ed. 1963 (by standard acetic acid anhydride and pyridine).

Typical aromatic amine beginning materials suitable for use in making the aromatic amine formaldehyde resins used in this invention are aromatic amines which have at least one primary amine group, or at least one secondary amine group substituted on an aromatic nucleus per molecule.

The aromatic starting amines which can be employed can be of many different types. Thus, it can be a class represented by the formula:

(3) $\quad\quad\quad ArNH_2$ wherein Ar is an aryl group which has at least one unsubstituted reactive position on the aromatic nucleus. It can also be a class represented by the formula:

(4) $\quad\quad\quad Ar\underset{R_5}{NH}$ wherein Ar is as just defined and $R_5$ is an alkyl radical, an aryl radical, an aralkyl radical, an alkaryl radical, or the like. Preferably, in Formulas 3 and 4, Ar is a phenyl radical and $R_5$ contains less than 11 carbon atoms.

Ordinarily in both Formula 3 and Formula 4 amines, the reactive positions are those which are ortho and para to the amino group. Accordingly, aromatic amines which have at least one unsubstituted position ortho or para to the amino group are preferred for use in preparing the condensation products employed in this invention. The presently most preferred aromatic amines are aniline, the alkyl-substituted anilines wherein the alkyl groups thereof have from 1 to 4 carbon atoms, and the alkyl-substituted diaminobenzenes wherein the alkyl groups thereof have from 1 to 4 carbon atoms. Examples of representative and illustrative aromatic amines of Formulas 3 and 4 above are given in Tables I and II, respectively, below:

TABLE I

Examples of Formula 3 amines

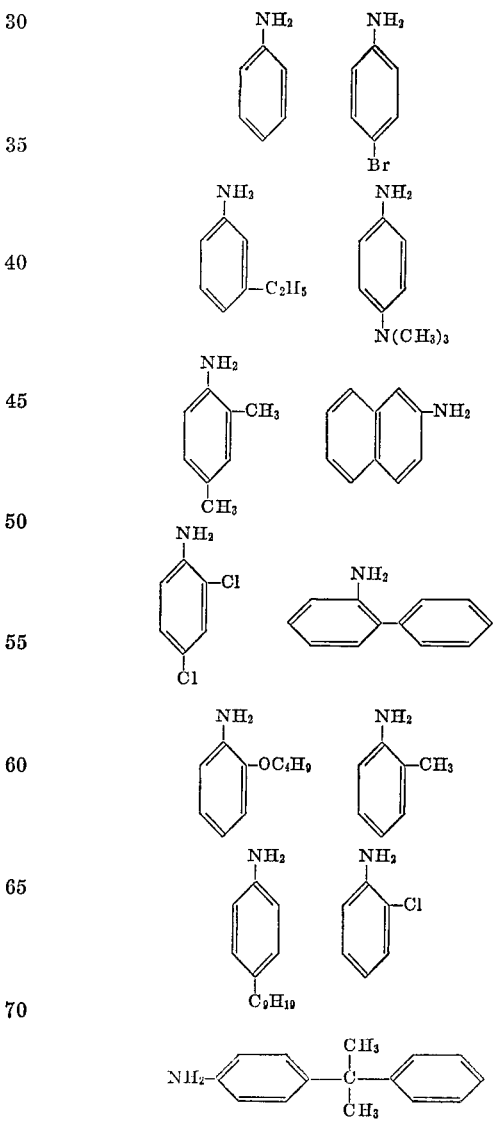

TABLE I—Continued

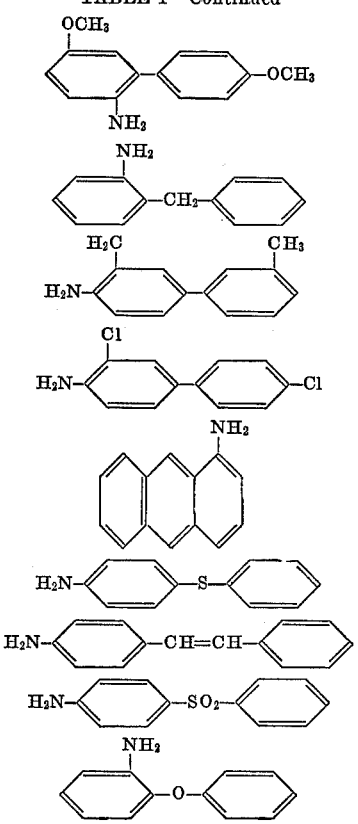

TABLE II
Examples of Formula 4 amines

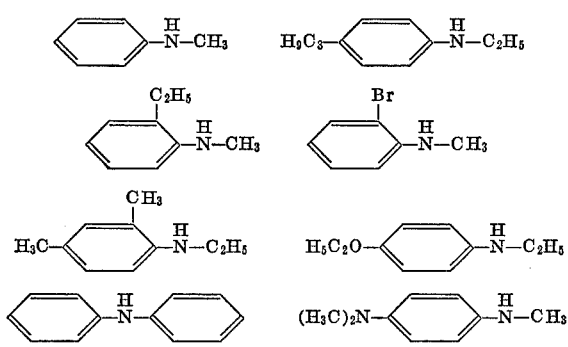

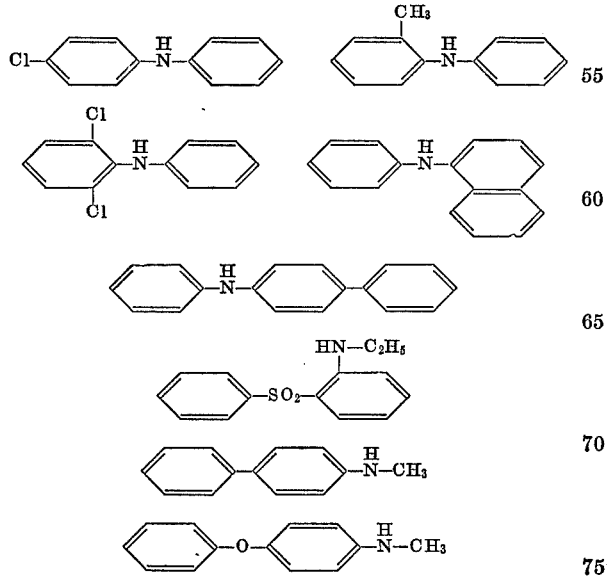

TABLE II—Continued

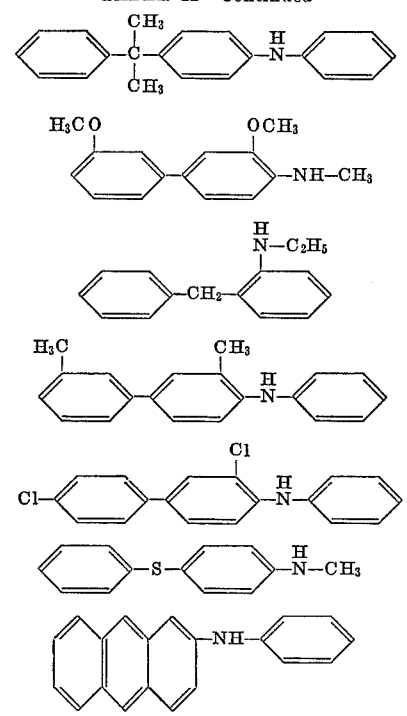

The amines operative in the present invention can be aromatic diamines. Both aromatic primary and secondary diamines are operative in the present invention, but the aromatic primary diamines are preferred over the secondary because the secondary diamines are less desirable as the thermal stability and hydrolytic stability are apparently less than the primary diamines. The diamines are of the general formula:

(5)　　　$H_2N-R_6-NH_2$　

wherein $R_6$ is a divalent aromatic radical. Also operative are aromatic diamines having the general formula:

(6)　　　$H_2N-R_6-NHR_7$　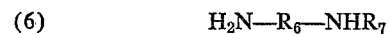

wherein $R_6$ is a above defined and $R_7$ is an alkyl radical, an aryl radical, an aralkyl radical, an alkaryl radical, or the like. Preferably, $R_6$ is a phenyl radical and $R_7$ is a lower alkyl radical. Examples of representative and illustrative aromatic amines of Formulas 5 and 6 above are given in Tables III and IV, respectively, below:

TABLE III
Examples of Formula 5 amines

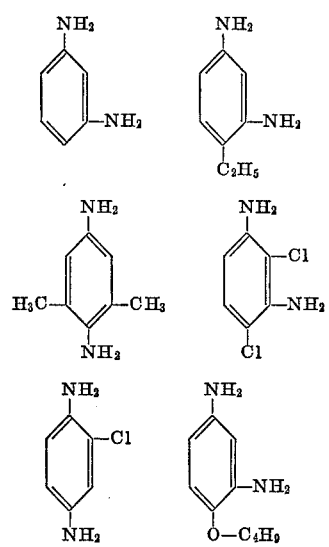

3,678,008
TABLE III—Continued
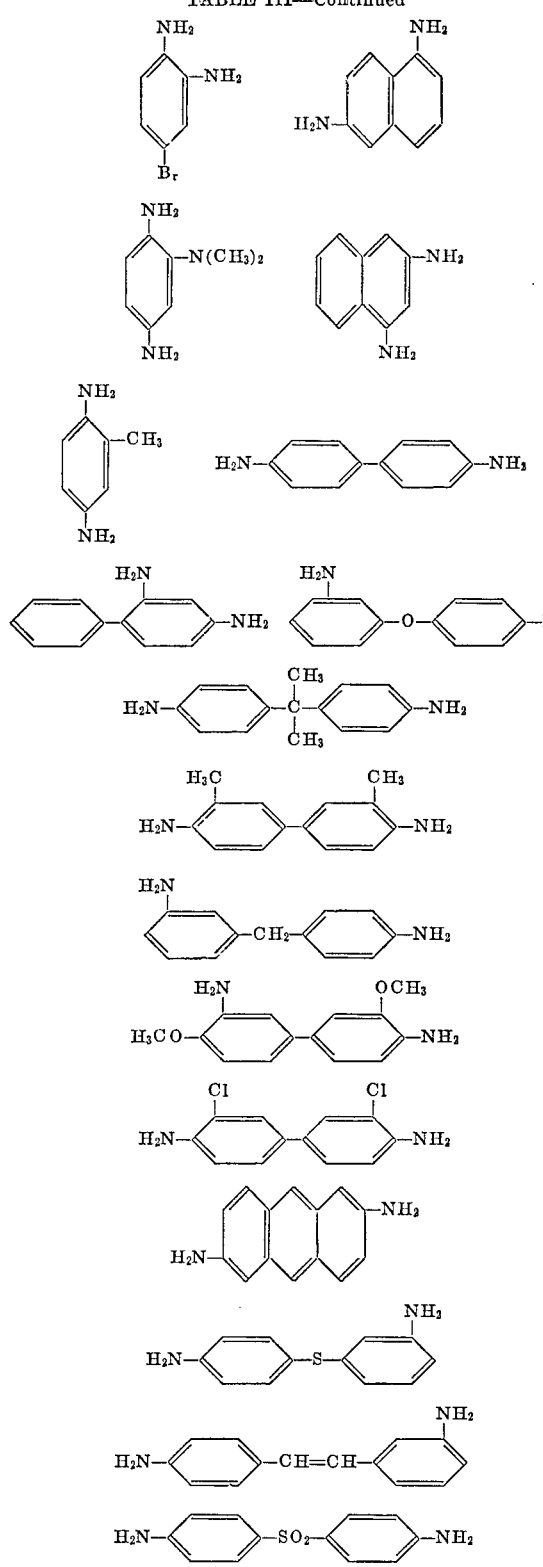
TABLE IV
Examples of Formula 6 amines
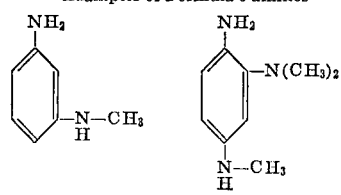
TABLE IV—Continued
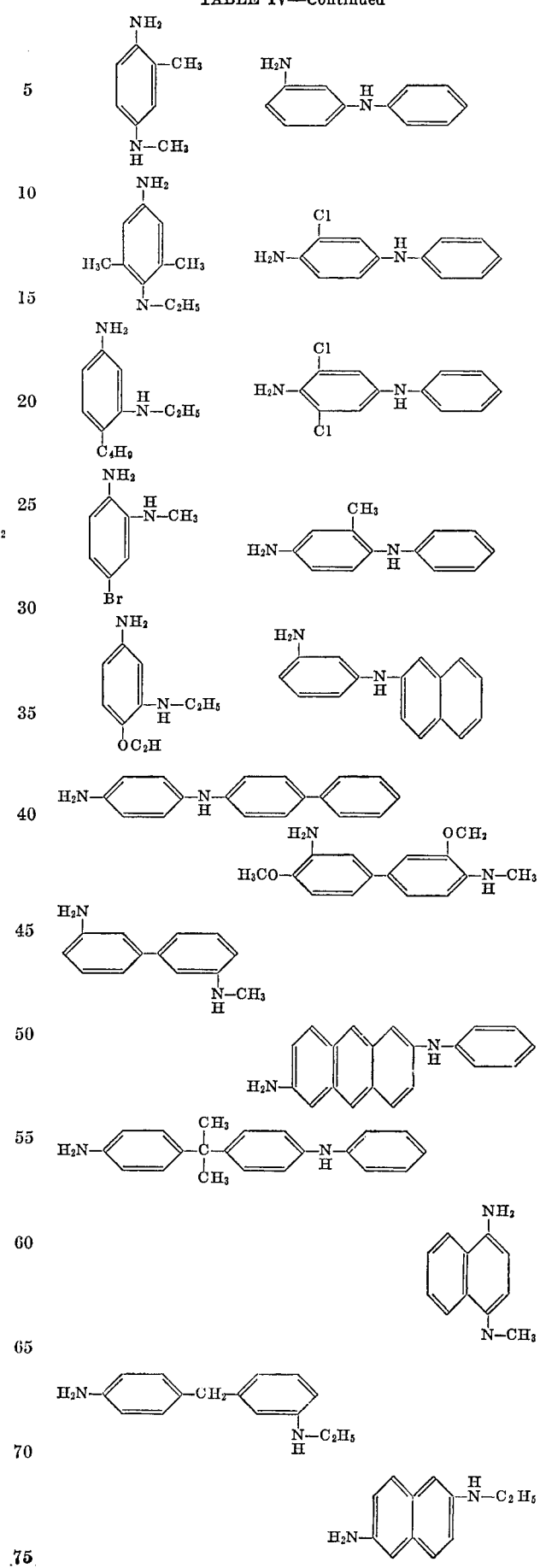

TABLE IV—Continued

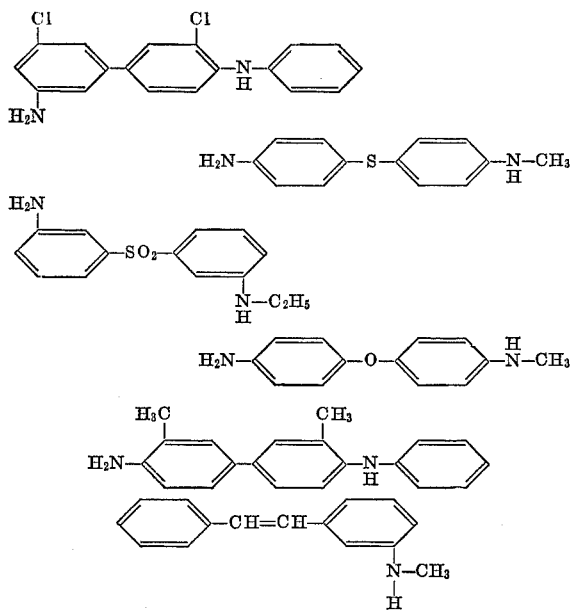

The formaldehyde employed can be in water solution or dispersion, or in an organic solvent, such as methanol. It is preferred to employ the formaldehyde in aqueous solution (such as the 37 weight percent aqueous solution known as formalin). Paraform can also be used.

When one makes an aromatic amine formaldehyde resin, it is convenient and preferred to condense the starting materials under aqueous liquid phase conditions using heat and an acid catalyst (preferably a weak acid catalyst). Conventional and preferred acid catalysts are organic carboxylic acids (mono or polybasic) which are relatively strong as respects their dissociation constants but substantially weaker than inorganic mineral acids such as sulfuric acid. Examples of suitable such acid catalysts include: aliphatic carboxylic acids, such as formic, propionic, oxalic, diglycolic, fumaric, itaconic, lactic, maleic, malonic, and the like, and aromatic mono and dicarboxylic acids, such as naphthoic, phthalic, salicylic, and the like.

The amount of acid catlayst employed can vary and the proportion of reactions employed is likewise not necessarily a critical factor, and can be varied over a wide range. For such a condensation, the acid catalyst is preferably formic acid, oxalic acid, or propionic acid in an amount of from about 0.5 to 5 parts catalyst per 100 parts aromatic amine (by weight). The temperature of reactants in such preferred embodiment can vary from about 60° to 100° C. Agitation of reactants during condensation is preferably continuous. It is not necessary for the reactants to be charged together to a reactor; thus, formaldehyde can be slowly added to a warmed mixture of aromatic amine and acid catalyst. The entire condensation may be carried out at reflux temperatures, if desired. Since a condensation reaction is apparently involved, the reaction mechanism, it is theorized, may involve formation of low molecular weight intermediates which initially form, and then possibly rearrange and combine with one another at a later stage. Typically, condensation reaction conditions are maintained until substantially all formaldehyde is consumed.

In general, conventional equipment can be employed for the condensation reaction. For example, a reaction kettle equiped with agitator, means for reflux and distillation, nitrogen inlet means, and conventional heat transfer means is suitable. The material of construction can be steel, stainless steel, glass, Monel, or the like.

In general, a preferred method for carrying out the condensation reaction of the formaldehyde, and aromatic amine starting materials is to add the formaldehyde slowly to an agitated mixture of aromatic amine containing a weak organic acid catalyst. This mixture is maintained at a temperature of from about 50° C. to about 125° C., and preferably from about 70° C. to about 105° C. during the addition. After the addition of formaldehyde, which can take from about one hour to about four hours or longer, the condensation reaction is continued for about 30 minutes to about 3 hours at a reaction temperature of from about 50° C. to about 125° C., and preferably from about 95° C. to about 100° C. At the end of the reaction period, the condensation product can then be recovered by stripping off water and unreacted reagents under reduced pressure at temperatures from about 110° C. to about 200° C. and preferably from about 140° C. to about 170° C.

In general, as first prepared, the aromatic amine formaldehyde resin is in the form typically of an aqueous solution or dispersion, the exact conditions and respective quantities and types of reactions in any given instance being determinative of the character of the product (including degree of advancement, color, etc.). The aromatic amine formaldehyde resin can be concentrated (and even prepared as a solid resin), and impurities, such as unreacted reactants, largely removed by means of dehydration under vacuum. As those skilled in the art appreciate, typical dehydration conditions are distillation under about 28 inches mercury vacuum until batch temperature reaches about 160° C., though any convenient conditions can be employed.

Yields of aromatic amine-formaldehyde resin typically vary from about 85 to 110 percent (based on combined starting (charged) weights of aromatic amine). In general, higher aromatic amine mol ratios give higher yields. Aniline formaldehyde resins prepared as just described generally have the above-described characteristics and constitute a preferred class of aromatic amine formaldehyde resins suitable for use in the present invention.

In general, for use in the present invention, aromatic amine formaldehyde resins are preferably prepared in the form of substantially anhydrous starting materials, as indicated above.

The aromatic polycarboxylic compounds

Turning to the aromatic polycarboxylic compounds of Formula 2, it will be appreciated that $R_4$, the monovalent hydrocarbon radical, is not a critical function in the present invention, and may be any monovalent alkyl, aryl, or even a cycloalkyl, halogenoalkyl, halogenoaryl or other halo-substituted radical (preferred chloro). When present, anhydride groups, each with a valence of two, and each containing two carbonyl-containing groups, are preferably attached to adjacent carbon atoms on an aromatic ring $R_3$. The Formula 2 compounds can contain any combination of anhydride, acid, or ester groups, as defined in Formula 2. A preferred number of carbonyl-containing groups per molecule is four, such as two anhydride groups, four acid groups, four ester groups, or some combination thereof, or the like. Preferred Formula 2 compounds include benzophenone tetracarboxylic dianhydride, pyromellitic dianhydride, and biphenyl dianhydrides.

As a class, the compounds of Formula 2 are known, as are methods for their preparation (so details concerning the latter are not given herein).

Examples of representative and illustrative aromatic polycarboxylic compounds of Formula 2 are given in Tables V and VI below:

TABLE V

Examples of Formula 2 anhydride compounds

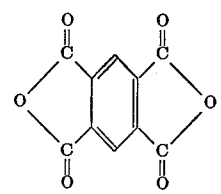

TABLE V—Continued
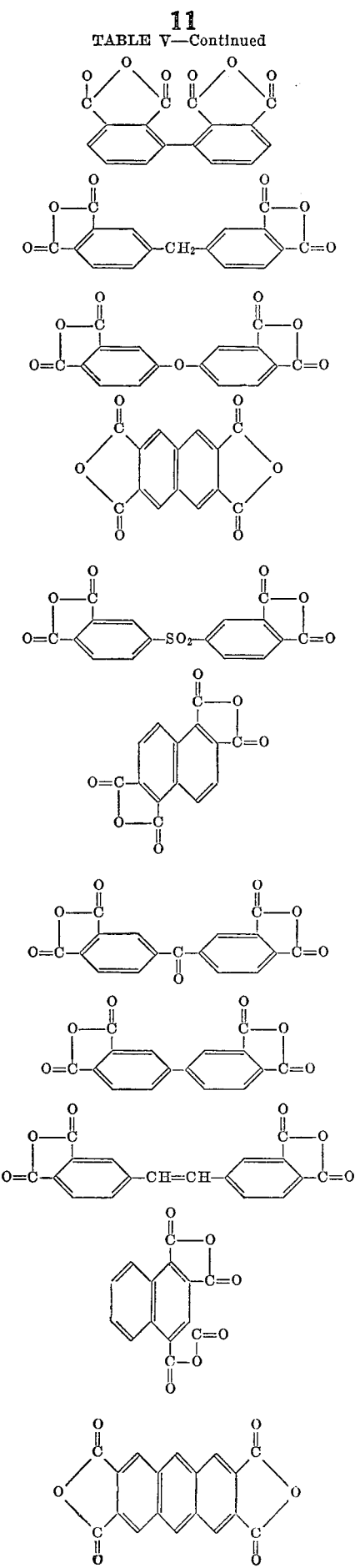
TABLE V—Continued
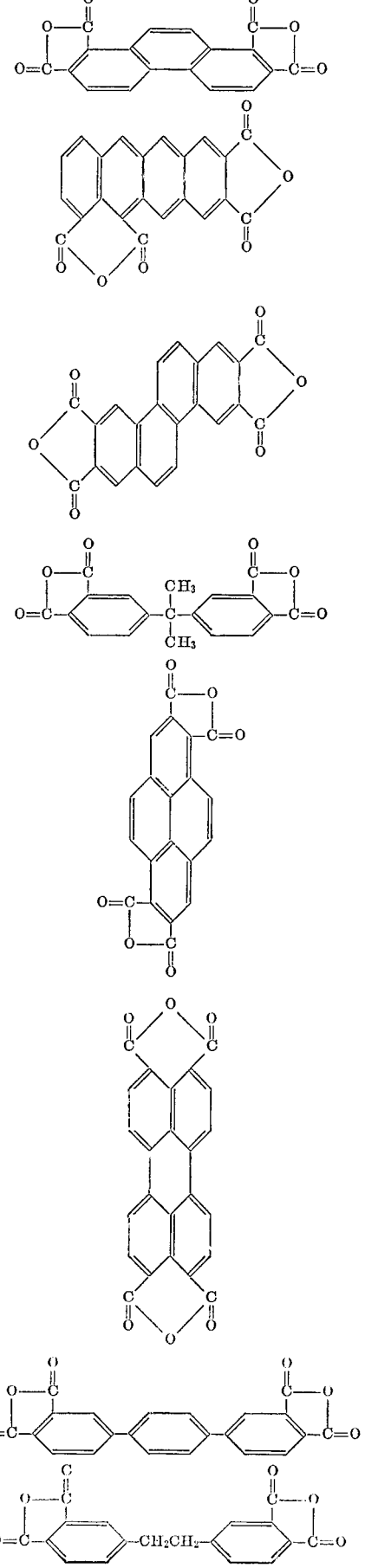

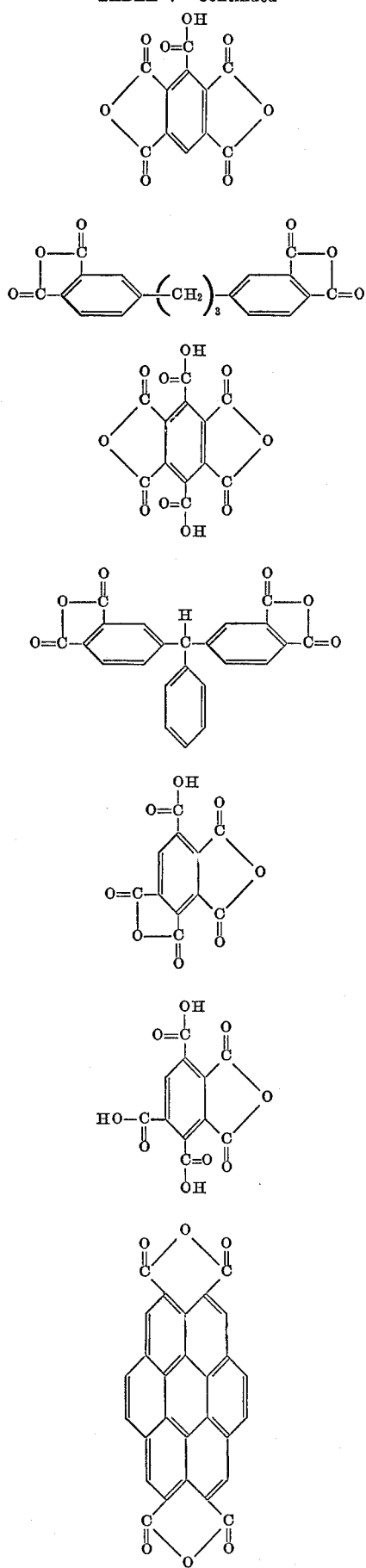
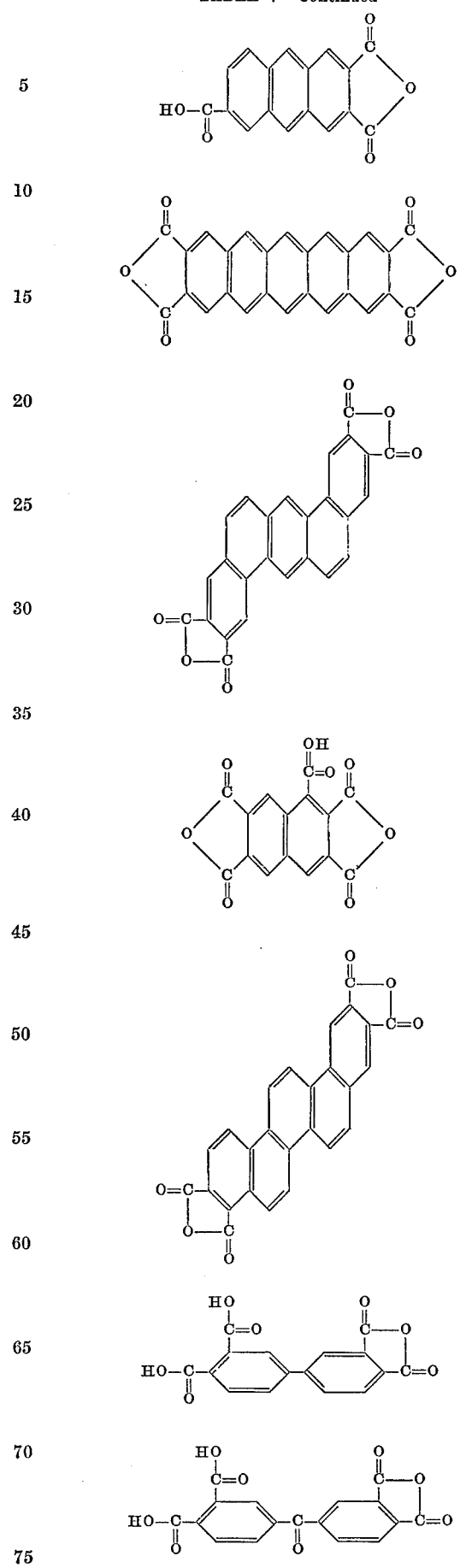

TABLE V—Continued
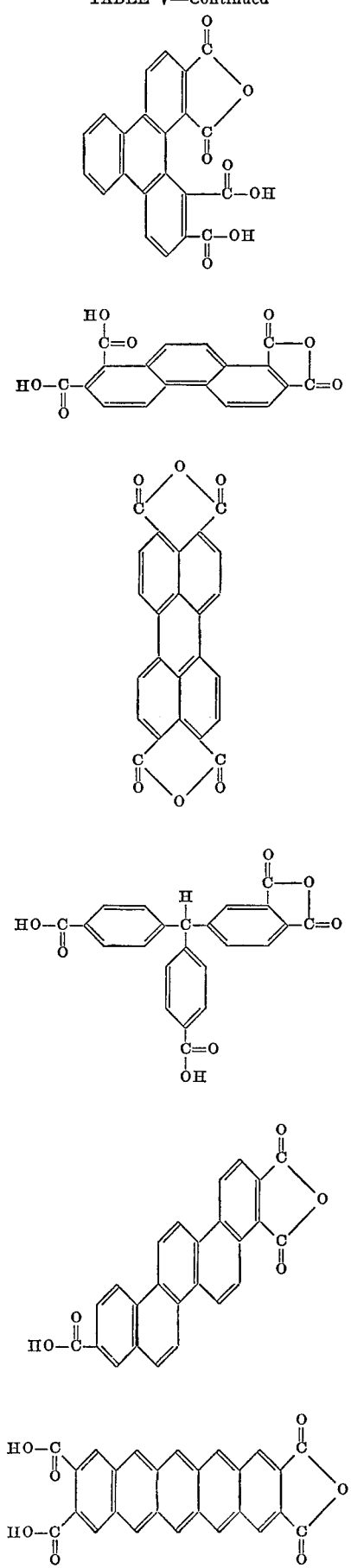
TABLE VI
Examples of Formula 2 esters and half esters
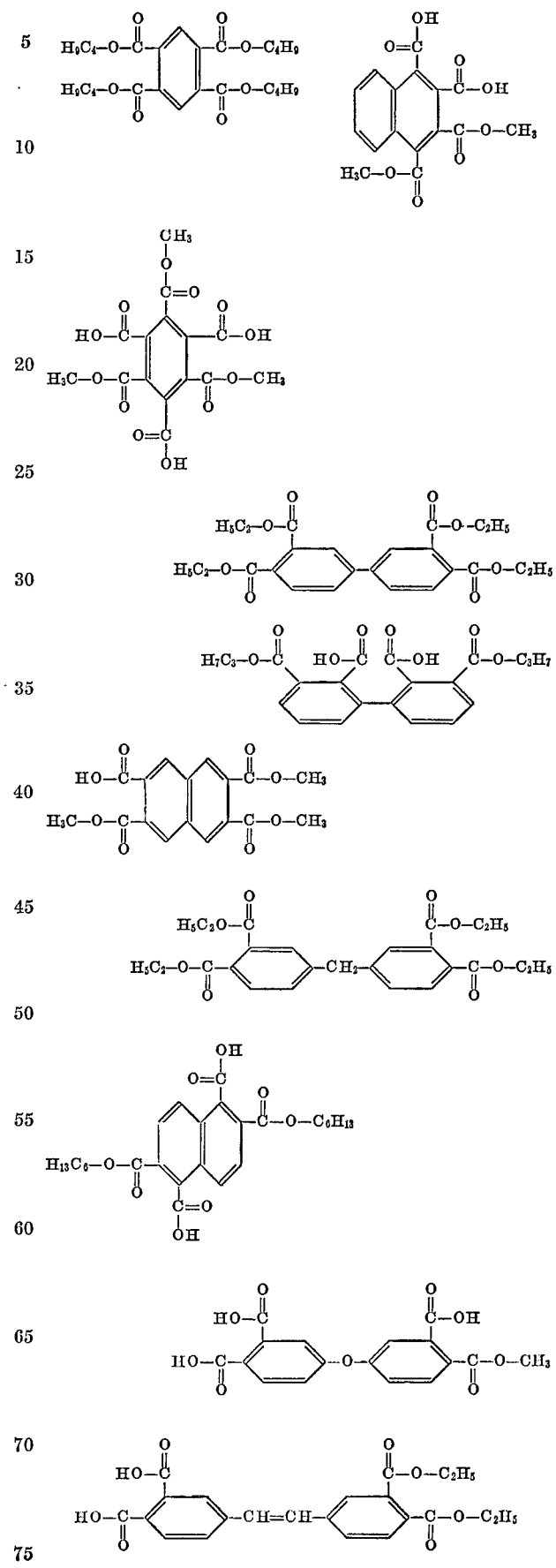

TABLE VI—Continued
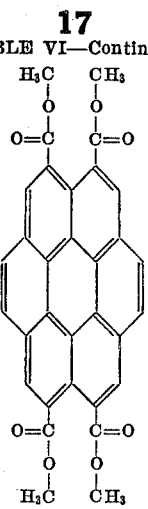
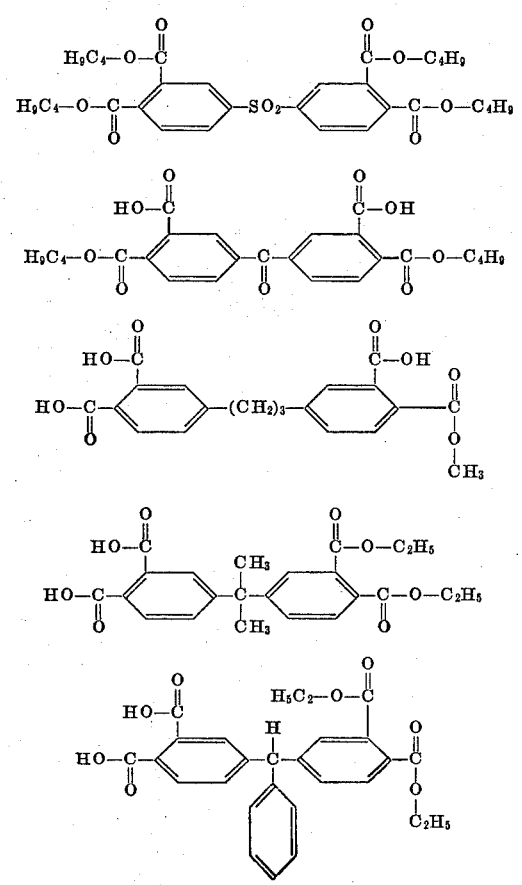
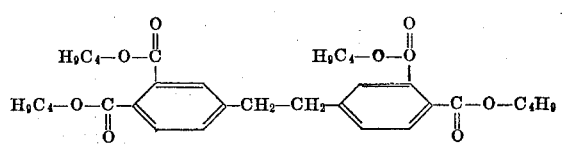
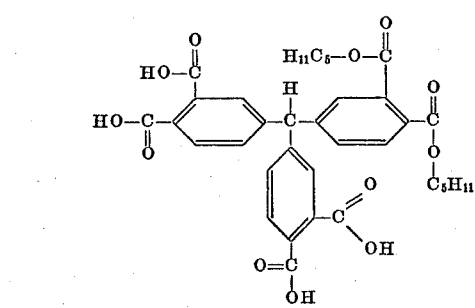
TABLE VI—Continued
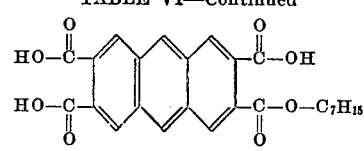
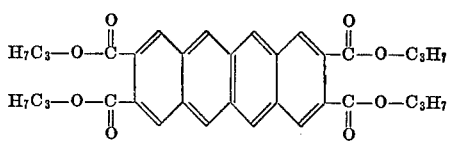
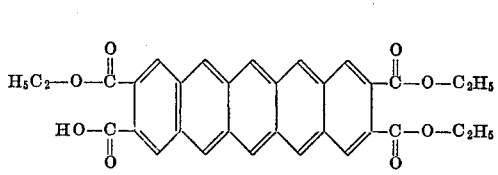
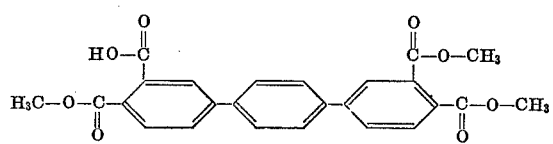
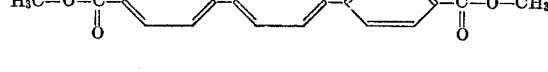
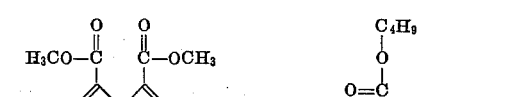
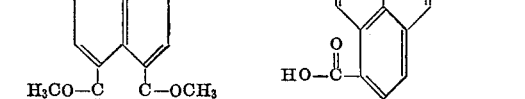
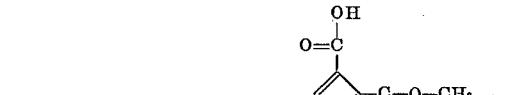
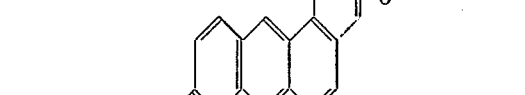
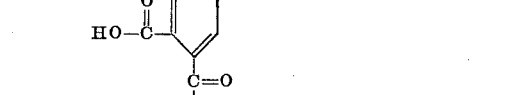

TABLE VI—Continued

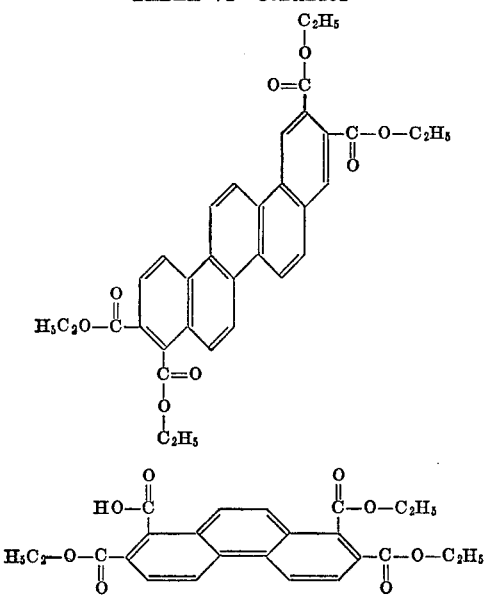

In general, for use in the present invention, aromatic polycarboxylic compounds are preferably prepared in the form of substantially anhydrous starting materials, as indicated above.

PREPARATION OF COMPOSITIONS

To make a thermosettable resinous composition of this invention, one can take an aromatic amine formaldehyde resin as described above and an aromatic polycarboxylic compound as described above and simply mix the two components together until a substantially uniform product mixture is obtained, the relative proportions of each component being as described above.

Preferably, the proportion of aromatic polycarboxylic compound to aromatic amine formaldehyde resin in a given composition is such that amide and imide linkages can be formed during thermosetting at each amine hydrogen site of each aromatic amine formaldehyde resin molecule. However, thermosettability is frequently achievable by using less than all available amine hydrogen sites in such a resin molecule when crosslinking with an aromatic polycarboxylic compound as taught in this invention. Also, thermosettability is not appreciably affected, within wide limits, by using more or less than the stoichiometric amounts of aromatic polycarboxylic compounds in relation to a given quantity of aromatic amine formaldehyde resin. During thmermosetting, it should be noted that especially at higher temperatures, e.g. temperatures say above 200° or more, typically, though not necessarily, rearrangements can occur in a thermosetting product which result in a higher concentration of one form of linkage as opposed to another. For example, it is tentatively theorized (and there is no intent to be bound by theory herein) that at higher temperatures, rearrangements to form imide linkages are common.

In general, the thermosettable resinous compositions of this invention are in the form of either powders, which are characteristically free flowing, or liquids which are in the form of varnishes, which are solutions or dispersions in which the liquid medium thereof is organic (and preferably substantially anhydrous) in character.

When making a solid, thermosettable composition of this invention, it is preferred to use an aromatic amine formaldehyde resin and an aromatic polycarboxylic compound (each as described above, respectively) in the form of solids which have particle sizes generally under about 100 mesh (U.S. Standard sieves). Preferably, particle sizes under about 50 mesh are used. The admixing of one component with the other can be made in a blender, such as a Waring Blendor, a ball mill, or the like, although any convenient mechanical mixing means may be employed.

On the other hand, when preparing a liquid thermosettable composition of this invention, either or both the aromatic amine formaldehyde resin or the aromatic polycarboxylic compound may initially be in a solid or a liquid form. Thus, the aromatic amine formaldehyde resin, even in its substantially anhydrous form may be in a liquid condition. Although the aromatic polycarboxylic compound, even in its dehydrated form, may also be in a liquid condition, typically such aromatic polycarboxylic compound is in the form of a relatively high melting solid.

As indicated, an organic liquid is used to dissolve or disperse eiher or both the aromatic amine-formaldehyde resin and the aromatic polycarboxylic compound. In general, the organic liquid used is one which is:

(1) substantially inert (as respects each of the aromatic amine formaldehyde resin and the aromatic polycarboxylic compound), (2) boils below about 250° C. (preferably 150° C.) at atmospheric pressure, (3) is a mutual dispersant for both the aromatic amine formaldehyde resin and the aromatic polycarboxylic compound, and (4) is substantially single phased.

By the term "mutual dispersant" as used herein reference is had to the fact that a given organic liquid is capable of acting either as a solvent and/or as a colloidal suspending medium for the aromatic amine formaldehyde resin and for the aromatic polycarboxylic compound in a product thermosettable composition of this invention. As used herein, the term "coilloidal" in reference to a suspension or dispersion has reference to suspended or dispersed solid particles which are under about 200 millimicrons in average maximum individual particle size dimension.

By the term "substantially single phased" reference is had to the fact that a given organic liquid exists in a liquid composition of this invention as one phase.

While the organic liquid used has properties as indicated above, it will be appreciated that such a liquid in a particular composition of the invention can comprise mixtures of two or more chemically different organic liquids. For example, one can preliminarily dissolve or disperse the aromatic amine formaldehyde resin in one particular liquid, and the aromatic polycarboxylic compound in another particular organic liquid, and then thereafter mix the two resulting such organic liquids together. Obviously, when one uses such a mixture of different organic liquids, the liquids are so chosen as to be mutually intermiscible with one another at least in the respective amounts of the individual organic liquids employed in a given product mixture in order to obtain a compatible one phase liquid medium.

It is desirable and preferred to have a single phase organic liquid in liquid thermosettable compositions of this invention because of the possibility of having a concentration either of aromatic polycarboxylic compound or of aromatic amine-formaldehyde resin which is greater in one liquid phase than in the other. Such a concentration differential could possibly lead to irregularities and non-uniformities in a thermoset composition derived therefrom, as those skilled in the art will appreciate.

Preferred organic liquids (especially when one is using as the organic liquid a single chemical entity) are lower alkanones, such as acetone, methyl ethyl ketone or higher ketone. On the other hand, when one uses as the organic liquid a mixture of different organic entities, one can employ as preferred liquids lower alkanols, such as ethanol or methanol, aromatic and aliphatic (including cycloaliphatic) hydrocarbons, including benzene, toluene, xylene, naphthalene, nonane, octane, petroleum fractions, etc. Conveniently, some of the organic liquid present can be excess alcohol left over from an esterification reaction involving an aromatic polycarboxylic compound. Any given organic liquid used in a composition of this invention is preferably substantially anhydrous, as indicated above.

Preferably, the aromatic amine-formaldehyde resin starting materials are substantially completely dissolved in the organic liquid phase of a liquid composition of this invention. If not so dissolved, the non-dissolved portion thereof is in the form of a colloidal dispersion or suspension of particles.

Similarly, the aromatic polycarboxylic compound starting materials are substantially completely dissolved in the organic liquid phase of a liquid composition of this invention. If not so dissolved, the non-dissolved portion thereof is in the form of a colloidal dispersion or suspension of particles.

Those skilled in the art will appreciate that organic solvents can be added to a given liquid composition of this invention to improve the quantity of respective starting materials in true solution. For example, adding a ketone or an ester ether solvent, or even a so-called "super" solvent, such as dimethyl formamide, will generally improve the ability of a given composition to dissolve both classes of component starting materials.

The respective concentrations of the aromatic amine-formaldehyde resin and of the aromatic polycarboxylic compound in a given liquid composition of this invention relative to the total amount of organic liquid present can vary over extremely wide ranges. A rough but practical indication of the concentration of the respective starting materials in a given liquid composition is given by the viscosity of such a composition. A correlation between viscosity and particular contemplated end use can sometimes be made, as those skilled in the art will readily appreciate. Characteristically, though not limitatively, a liquid varnish composition of this invention can have viscosities ranging from about 10 to 5000 centipoises. For impregnating applications, viscosities of from about 50–500 centipoises are usually preferred. The total solids content of a given liquid composition can be as high as about 75 weight percent or even higher, and as low as about 20 weight percent or even lower. Preferred solids contents usually fall in the range of from about 50 to 70 weight percent as those skilled in the art will readily appreciate.

Liquid compositions of this invention can be advanced (e.g. crosslinked as by heating) to some extent without forming precipitates from the organic liquid. Advancing can be accomplished if desired by heating at temperatures generally in the range of from about 70 to 100° at atmospheric pressures for times typically in the range of from about 20 to 30 minutes or even longer, care being taken not to cause solid material to precipitate.

In both the solid and the liquid compositions of this invention, it will be appreciated that the ratio of aromatic amine-formaldehyde to aromatic polycarboxylic compounds is as indicated above. However, mixtures of different aromatic amine-formaldehyde resins and of different aromatic polycarboxylic compounds can be employed in any given composition to enhance characteristics desired for a particular end use application as those skilled in the art will readily appreciate.

Those skilled in the art will readily appreciate that various conventional additives can be composited with the solid or liquid compositions of this invention to promote effectiveness for particular end uses. For example, one can add dyes, colorants, release agents, fungicides, coupling agents, and the like.

In the case of the powdered products of this invention, one can add particulate solid diluent materials to produce molding compositions. For example, a typical molding composition using a composition of this invention contains from about 25 to 40 weight percent of a composition of this invention, and, correspondingly, from about 60 to 75 weight percent of particulate inert diluent. A molding composition typically contains in addition from about 1 to 2 weight percent of a lubricant and from about 1 to 2 weight percent of a colorant, though relatively higher percentages of these last indicated components can be present herein.

USES

As indicated above, the solid compositions of this invention can be used as molding powders. In general, conventional molding powder technology can be employed in the utilization of such solid compositions. Sometimes it is desirable in order to avoid blistering to cool a given mold as those skilled in the art will appreciate. The solid resins can also be used to bond aluminum oxide grits commercially utilized in abrasives.

The liquid compositions of this invention find use for impregnation and reinforcing purposes. Thus, the liquid compositions can be used, to impregnate cellulosic paper, asbestos paper and other known woven sheet structures as well as woven fabrics (such as glass fibers, cotton fibers, nylon fibers, etc.) and the like. Impregnation can be accomplished by any conventional or convenient means including dipping, coating, spraying, or the like. The so-impregnated material is conventionally air-dried to lower the volatiles content and then is heated to advance the composition of this invention to a particular desired degree for the ultimate intended use. The so-impregnated sheet materials as indicated above are useful in electrical applications as supports or as insulation for conductive elements. The laminates so made are particularly characterized by superior heat resistance and thermal stability characteristics. The laminates are generally manufactured in a sheet or block form which is then machined to provide desired configuration for a particular end use.

Oil filters, such as for use in automobiles, can be prepared from the impregnated sheet members produced as generally described above. For example, one can impregnate with a liquid composition of this invention, cellulosic papers modified with a synthetic fiber such as a polyester or the like and having a thickness of from about 5 to 20 mils. Sufficient liquid composition is used to impregnate such a sheet member so that the product sheet member when cured has a resin content of from about 15 to 25 weight percent based on the total product weight. After such a paper is impregnated, it is typically heated to partially advance the resin composition and then is corrugated or pleated to form a filter element. The filter element is then assembled with an end use filter condenser and the whole assembly is heated to say from about 250 to 350° F. for from about 5 to 20 minutes to cure the resin. When cured, the product has excellent high temperature characteristics.

In addition, a liquid composition of the present invention can be used to make reinforced plastics.

In this invention, all solids in liquids are conveniently measured using ASTM Test Procedure D115–55.

EMBODIMENTS

The following examples are set forth to illustrate more clearly the principles and practices of this invention to one skilled in the art and they are not intended to be restrictive but merely to be illustrative of the invention herein contained. Unless otherwise stated therein, all parts and percentages are on a weight basis.

The following examples illustrate preparation of amine modified novolacs.

EXAMPLE A

Preparation of aromatic amine aldehyde resin 1200 grams (12.9 moles) of aniline was heated to 70° C. in a 3-liter, 3-neck Pyrex reaction flask that was equipped with stirrer, thermometer, reflux condenser and dropping funnel. At 70° C., 15.6 grams (0.38 mole) of 90% strength formic acid was added and allowed to mix.

Next, over about a 2 hour period, 775 grams (12.9 moles) of 50 weight percent aqueous formaldehyde solution was added to the reaction mixture while stirring vigorously. The temperature of the reaction mixture was gradually increased so that at the end of the formaldehyde addition the temperature was about 100° C. The reaction mixture was refluxed for about 45 minutes at about 100° C. The reaction flask was then changed over to vacuum distillation conditions and vacuum slowly applied up to about 7" Hg (temperature leveled at about 90° C.). As the temperature reached about 95° C. (with about 7" Hg (vacuum), the vacuum was increased slowly to about 10" Hg. As the temperature reached about 100° C., the vacuum was increased slowly to about 20" Hg. When the temperature reached about 110° C., the vacuum was increased slowly to 28" Hg. The temperature was then allowed to rise to 160° C. with 28" Hg of vacuum while continuing to distill. At 150° C., the distillation was stopped and the product poured into a pan to cool. The resulting aromatic amine aldehyde resin was a clear, low melting solid at room temperature. The yield of solid resin was about 113% on the aniline charge.

EXAMPLES B–F

Following the same general procedure described in Example A, a series of aromatic amine aldehyde resins were prepared from various aromatic amines and aldehydes. Table I below, describes each resin:

TABLE I

| Example | B | C | D | E | F |
|---|---|---|---|---|---|
| Aromatic amine | Aniline | Aniline | O-toluidine | Aniline | O-chloroaniline |
| Aldehyde | Formaldehyde | Formaldehyde | Formaldehyde | Acetaldehyde | Formaldehyde |
| Molar ratio of aldehyde to aromatic amine | 0.75/1 | 0.90/1 | 1/1 | 1/1 | 0.90/1 |
| Catalyst | Propionic acid | Oxalic acid | Formic acid | Formic acid | Oxalic acid |

EXAMPLE G

Preparation of ½ dibutyl ester of benzophenone tetracarboxylic acid dianhydride solution A mixture of 1500 grams (20.3 moles) of n-butyl alcohol and 1250 grams (3.88 moles) of benzophenone tetracarboxylic acid dianhydride (BTDA) is heated over a period of about one hour to about 125° C. in a 5-liter, 3-neck Pyrex reaction flask that is equipped with stirrer, thermometer and reflux condenser. At about 123° C., the foregoing mixture becomes clear. It is then allowed to cool slowly to room temperature at which temperature it remained a clear, amber colored liquid of medium viscosity. Yield: About 2750 grams.

EXAMPLE H

Preparation of ½ butyl ester of mellitic dianhydride (benzene hexacarboxylic acid dianhydride)

A mixture of 9569 grams (12.9 moles) of n-butyl alcohol and 612 grams (2.0 moles) of mellitic dianhydride is heated over a period of about one hour to about 115° C. in a 5-liter, 3-neck Pyrex reaction flask that is equipped with stirrer, thermometer, and reflux condenser. At about 113° C., the foregoing mixture becomes clear. Upon allowing it to cool slowly, it starts to become opaque at about 80° C. and is a white colored, almost solid material at room temperature. Yield: About 1568 grams.

EXAMPLE I

Preparation of mixed ½ dipropyl ester of benzophenone tetracarboxylic acid dianhydride and pyromellitic dianhydride solution A mixture of 2000 grams (33.3 moles) of n-propyl alcohol, 1000 grams (3.11 moles) of benzophenone tetracarboxylic acid dianhydride (BTDA) and 10000 grams (4.6 moles) of pyromellitic dianhydride is heated over a period of about one hour to about 105° C. in a 5-liter, 3-neck Pyrex reaction flask that is equipped with stirrer, thermometer and reflux condenser. At about 102° C., the foregoing mixture becomes clear. Upon allowing it to cool slowly, it starts to become cloudly at about 65° C. and is a white colored liquid dispersion of medium viscosity at room temperature. Yield: About 4000 grams.

EXAMPLE J

Preparation of solid ½ butyl ester of benzophenone tetracarboxylic acid dianhydride A mixture of 505 grams (6.82 moles) of n-butyl alcohol and 1095 grams (3.40 moles) of benzophenone tetracarboxylic acid dianhydride (BTDA) is heated over a period of about one hour at about 150° C. in a 3-liter, 3-neck Pyrex reaction flask that is equipped with stirrer, thermometer and reflux condenser. At about 145° C., the foregoing mixture becomes clear. It is then allowed to cool slowly to about 130° C. Vacuum is applied up to about 28" Hg and the resinous mixture distilled until the temperature reached about 160° C. The resulting condensation product is a clear, brittle, glass-like solid at room temperature which shows a tendency to become sticky in the presence of moisture. Yield: About 1425 grams.

EXAMPLE K

Preparation of tetrahexyl ester of pyromellitic dianhydride

A mixture of 2448 grams (24 moles) of n-hexyl alcohol, 655 grams (3 moles) of pyromellitic dianhydride (PMDA) and 15 grams (0.08 mole of p-toluene sulfonic acid is refluxed at about 160° C. for 8 hours in a 5-liter, 3-neck Pyrex reaction flask that is equipped with stirrer, thermometer and reflux condenser. The water formed is removed by distillation. The product is a liquid of low viscosity.

Examples of compositions of this invention follow:

EXAMPLE 1

Preparation of thermosetting varnish from aromatic aminealdehyde and an aromatic polycarboxylic compound A 50 percent resin solution is made by dissolving 1000 grams at the solid resin from Example A in 1000 grams of Cellosolve. Alternatively, this solution is made by adding the solvent to the molten resin at the end of the resin distillation cycle. The resulting solution is a clear, amber colored liquid of medium viscosity. To this solution is added 1720 grams of ½ dibutyl ester of benzophenone tetracarboxylic acid dianhydride solution from Example V. With sufficient mechanical blending, the mixture gave a clear, amber color varnish. When a small amount (1–2 grams) is placed on a hot-plate at about 180° C., this varnish cures to a hard thermoset resin following evaporation of the solvent. Properties of this varnish are as follows: Viscosity about 600 cps., ASTM solids about 66 percent and an extended G.E. gel time. Cellosolve is ethylene glycol monoethyl ether.

EXAMPLES 2–19

Preparation of varnish

Following the same procedure described in Example 1, a series of varnishes are prepared from amine-modified phenolic resins and aromatic polycarboxylic compounds. Table II below describes each resin.

TABLE II

| | 2 | 3 | 4 | 5 | 6 | 7 |
|---|---|---|---|---|---|---|
| Part A: | | | | | | |
|   Resin identification (Ex. No.). | B | A | C | D | E | A. |
|   Solvent | Methyl ethyl ketone | DMF | Ethyl butyl ketone | Methyl ethyl ketone | Methyl ethyl ketone | Cellosolve. |
|   Resin concentration, percent | 50 | 30 | 50 | 60 | 50 | 50. |
| Part B: | | | | | | |
|   Aromatic polycarboxylic compound. | G | BTDA* | I | K | G | H. |
| Ratio by weight of A to B in final varnish. | 0.7/1 | 0.7/1 | 0.8/1 | 0.4/1 | 0.7/1 | 0.6/1. |

*Benzophenone tetracarboxylic acid dianhydride.

EXAMPLE 8

Preparation of thermosetting resin powder from aromatic amine-aldehyde resin and an aromatic polycarboxylic compound 500 grams of resin from Example A, 843 grams of aromatic polycarboxylic compound from Example J and 10 grams of calcium stearate are ground together in a laboratory ball mill until essentially all of the material passed U.S. Sieve No. 140. The product is a tan colored resin powder. When a small amount (1–2 grams) is placed on a hot-plate at about 180° C. this resin melts and then cures to a hard thermoset resin.

EXAMPLES 9–10

Following the same general procedure described in Example 7, a series of resin powders are prepared from amine-modified phenolic resins and aromatic polycarboxylic compounds. Table III below describes each resin.

TABLE III

| | 9 | 10 | 11 |
|---|---|---|---|
| Part A: Resin identification (Ex. No.) | C | D | F |
| Part B: Aromatic polycarboxylic compound identification (Ex. No.) | J | J | J |
| Ratio by weight of A to B in final product | 0.5/1 | 0.6/1 | 0.7/1 |

EXAMPLE 11

Part A

Sheets of glass cloth E.C.D.-225-181 finished with gamma-aminopropyltriethoxysilane are impregnated by dipping the cloth in the resin solution prepared in Example I, and removing the excess resin solution by drawing the cloth over a scraper bar. The impregnated cloth is heated in an oven for about ¼ hour at about 135° C. to remove the solvent from the impregnated cloth and to partially advance the resin. The resulting cloth contains about 40% resin solids and about 6% of volatiles.

Part B

A series of laminates ⅛" thick are prepared from 12 sheets of resin impregnated cloth prepared as described in Part A. The 12 plies of cloth are laid up with the warp running in the same direction in all plies and the assembly is pressed under a pressure of approximately 300 p.s.i. at a temperature of 350° F. for 90 minutes. After being removed from the mold, the laminate is post-cured by being heated in an air-circulating oven in accordance with the following schedule:

24 hours at 310° F.
24 hours at 350° F.
24 hours at 400° F.
4 hours at 450° F.
48 hours at 500° F.

These laminates have flexural strengths in the range of from about 70,000 to 90,000 p.s.i. at 75° F. The above and all subsequently reported flexural strength values are measured by Federal Specification L–P–406 Test Method No. 1031.

Part C

The laminates prepared in Part B above are maintained in an air-circulating oven for 100 hours at 600° F. The flexural strengths of the laminates are then determined at 600° F. with values of from about 30,000 to 50,000 p.s.i. being obtained.

What is claimed is:

1. A thermosettable resinous composition comprising in combination:
   (A) an aromatic amine-formaldehyde resin having a primary amine content smaller than about 70 mol percent and a secondary plus tertiary amine content greater than about 30 mol percent where 100 mol percent is the total amine content, said resin being further characterized by having:
      (1) a number average molecular weight of from about 300 to 1200,
      (2) at least two aryl moieties per molecule, the aryl nucleus of each aryl moiety containing from 6 through 10 carbon atoms each,
      (3) less than 0.4 divalent methylene bridging moieties per said aryl moiety, each bridging moiety having each unsatisfied valence of its carbon atom each bonded to a different one of said aryl moieties,
      (4) a number average of primary amine groups per said aryl moiety of less than about 0.70,
      (5) a number average of methylene amine groups (i.e. —$CH_2N$—) per said aryl moiety of greater than about 0.3,
      (6) a percent nitrogen acetyl of from about 10 to 30, and
   (B) an aromatic polycarboxylic compound consisting essentially of a compound of the formula:

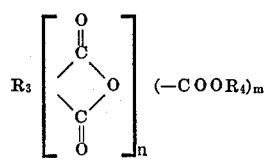

where:
   $R_3$ is an aromatic radical of four, five, or six valences which contains from 6 through 24 carbon atoms,
   $R_4$ is selected from the group consisting of hydrogen, and monovalent hydrocarbon radicals containing less than 8 carbon atoms each,
   $n$ is an integer of from 0 through 2,
   $m$ is an integer of from 0 through 6,
   the sum of $n$ plus $m$ is always at least two,
   when $n$ is 0, $m$ is at least 4,
   when $n$ is 0, $m$ is at least 4,
   when $m$ is 0, $n$ is at least 2,
   when $n$ is 1, $m$ is at least 2,
   (C) the relative proportions each of said amine-modified resin and of said aromatic polycarboxylic compound being such that said composition is thermosettable by heat.

2. A thermoset composition of claim 1.

3. A composition of claim 1 wherein said resin and said compound are dissolved in an organic liquid medium.

4. A composition of claim 1 wherein said polycarboxylic compound is a diester of benzophenone tetracarboxylic acid.

5. A composition of claim 1 wherein said polycarboxylic compound is benzophenone tetracarboxylic acid dianhydride.

6. A composition of claim 1 wherein said polycarboxylic compound is pyromellitic dianhydride.

7. A composition of claim 1 wherein the aromatic amine of the aromatic amine-formaldehyde resin is selected from the group consisting of aniline, o-toluidine and o-chloroaniline.

References Cited
UNITED STATES PATENTS

| | | | |
|---|---|---|---|
| 3,238,181 | 3/1966 | Anderson | 260—65 |
| 3,459,829 | 8/1969 | Schmidt et al. | 260—72.5 X |

HOWARD E. SCHAIN, Primary Examiner

U.S. Cl. X.R.

117—126 GR, 138.8 N, 143 A, 155 L; 161—198, 259; 260—29.4 R, 32.8 N, 33.4 R, 33.6 R, 47 R, 72.5